United States Patent
Enoki

(10) Patent No.: US 8,840,525 B2
(45) Date of Patent: Sep. 23, 2014

(54) CONTROL APPARATUS FOR INTERNAL COMBUSTION ENGINE

(75) Inventor: Keiichi Enoki, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 488 days.

(21) Appl. No.: 12/786,967

(22) Filed: May 25, 2010

(65) Prior Publication Data

US 2011/0136622 A1     Jun. 9, 2011

(30) Foreign Application Priority Data

Dec. 3, 2009    (JP) ................................. 2009-275372

(51) Int. Cl.
*B60W 10/02*     (2006.01)
*B60W 10/06*     (2006.01)

(52) U.S. Cl.
USPC ............. 477/77; 477/102; 477/105; 477/176; 477/180

(58) Field of Classification Search
USPC ........................ 477/70, 77, 83, 101, 102, 105, 477/174–176, 180, 181
See application file for complete search history.

(56) References Cited

U.S. PATENT DOCUMENTS

| | | | |
|---|---|---|---|
| 6,908,413 B2 * | 6/2005 | Ayabe et al. | 477/109 |
| 6,942,598 B2 * | 9/2005 | Kondo et al. | 477/175 |
| 7,192,385 B2 * | 3/2007 | Yu | 477/176 |
| 7,247,123 B2 * | 7/2007 | Ohtake et al. | 477/181 |
| 7,645,210 B2 * | 1/2010 | Nakajima et al. | 477/107 |
| 7,670,257 B2 * | 3/2010 | Popp et al. | 477/174 |
| 7,722,499 B2 * | 5/2010 | Soliman et al. | 477/181 |
| 8,192,327 B2 * | 6/2012 | Gibson et al. | 477/77 |
| 2004/0229728 A1 * | 11/2004 | Oshima et al. | 477/176 |
| 2010/0174465 A1 * | 7/2010 | Gibson et al. | 701/70 |

FOREIGN PATENT DOCUMENTS

| | | |
|---|---|---|
| JP | 58-166165 A | 10/1983 |
| JP | 8-189395 A | 7/1996 |
| JP | 10-274260 | 10/1998 |
| JP | 11-078616 | 3/1999 |
| JP | 2002-144921 A | 5/2002 |
| JP | 2004-027844 A | 1/2004 |
| JP | 2004-353777 A | 12/2004 |
| JP | 2007-032388 A | 2/2007 |

OTHER PUBLICATIONS

Japanese Office Action dated May 8, 2012 in corresponding JP 2009-275372.

* cited by examiner

*Primary Examiner* — Jacob S Scott
(74) *Attorney, Agent, or Firm* — Sughrue Mion, PLLC

(57) ABSTRACT

Provided is a control apparatus for an internal combustion engine, which quietly restarts the engine with a reduced torque shock when a re-acceleration request is made by a driver. A control apparatus for an internal combustion engine, for controlling a clutch provided between the internal combustion engine and an automatic transmission, includes: an accelerator opening-degree detection unit for detecting a pressing amount of an accelerator; a fuel-supply stopping unit for stopping fuel injection to the internal combustion engine when the accelerator is not pressed down; and a clutch direct-coupling ratio control unit capable of arbitrarily changing a power amount transmitted by the clutch from engagement for direct coupling to disengagement of the clutch, in which, when the accelerator is pressed down while the clutch is disengaged in a fuel-supply stop state, the clutch is engaged in a slipping manner so that internal combustion engine rpm becomes equal to or higher than target cranking rpm to restart the internal combustion engine.

4 Claims, 3 Drawing Sheets

CONTROL APPARATUS FOR INTERNAL COMBUSTION ENGINE

BACKGROUND OF THE INVENTION

1. Field of the Invention

The present invention relates to a control apparatus for an internal combustion engine, which may automatically stop a vehicle engine when the vehicle engine is not required to be driven during an operation and may quickly restart the vehicle engine when a re-acceleration request is made by a driver.

2. Description of the Related Art

In a vehicle using an internal combustion engine as a power source, the following technology for improving fuel efficiency is conventionally known. In an operating state at the time of, for example, deceleration where a driver does not press down an accelerator because the driver does not intend to drive the vehicle, a clutch provided to a torque converter of an automatic transmission is engaged to directly couple the engine and the automatic transmission while fuel supply to the engine is stopped.

For example, the following technology is disclosed. When the deceleration is performed by stopping the fuel supply to gradually reduce engine rpm, the clutch is disengaged at predetermined engine rpm higher than engine idling rpm. At the same time, the fuel supply is restarted to perform idle control, thereby preventing an engine stall (for example, see JP 58-166165 A).

As a technology of further improving the fuel efficiency as compared with the above-mentioned conventional technology, the following technology is disclosed. The fuel supply remains stopped unless the driver presses down the accelerator. On the other hand, when the driver requests re-acceleration by pressing down the accelerator, the clutch is engaged and the fuel supply is restarted. If the rotation of the engine is stopped at this time, the engine is restarted by a starter so as to prevent engine idling, which does not contribute to drive of the vehicle, as much as possible (for example, see JP 08-189395 A).

Further, the following technology of restarting the engine is also disclosed. According to the technology, when the amount of pressing of a brake becomes small in a fuel-supply stop state during deceleration in a hybrid vehicle, it is judged that the driver has an intention to accelerate the vehicle. Then, the clutch is engaged to couple the engine and a drive train to each other. As a result, the engine is cranked by an inertia torque of the drive train while the fuel supply is started. In this manner, the engine is restarted (for example, see JP 2002-144921 A).

In the case where the method described in JP 08-189395 A is employed, however, if the accelerator is pressed down again after the engine rpm becomes equal to or lower than engine rpm at which the clutch is disengaged during the deceleration, there is a fear of generating a shock at the moment of engagement of the clutch. Moreover, the engine is restarted using the starter in the case where the rotation of the engine is stopped, and hence there is a fear in that gear meshing noise is generated in the starter each time the accelerator is pressed down during the deceleration.

Further, in the case where the method described in JP 2002-144921 A is employed, there is a fear of generating the shock at the moment of engagement of the clutch because the clutch is directly engaged to rotate the engine which was in a stop state until then. Moreover, when a vehicle speed is low, rpm is low on a drive side. Therefore, the engine rpm may not be increased to sufficient cranking rpm through an intermediation of the clutch. The cranking is required to be performed using the motor, and hence there is a fear of consuming extra electric power.

SUMMARY OF THE INVENTION

The present invention has been made to solve the problems described above, and has an object to provide a control apparatus for an internal combustion engine, which quietly restarts the engine with a reduced torque shock when a re-acceleration request is made by a driver in the engine that is automatically stopped when the engine is not required to be driven.

According to the present invention, a control apparatus for an internal combustion engine, for controlling a clutch provided between the internal combustion engine and an automatic transmission, includes: accelerator opening-degree detection means for detecting a pressing amount of an accelerator; fuel-supply stopping means for stopping fuel injection to the internal combustion engine when the accelerator is not pressed down; and clutch direct-coupling ratio control means capable of arbitrarily changing a power amount transmitted by the clutch from engagement for direct coupling to disengagement of the clutch, in which, when the accelerator is pressed down while the clutch is disengaged in a fuel-supply stop state, the clutch is engaged in a slipping manner so that internal combustion engine rpm becomes equal to or higher than target cranking rpm to restart the internal combustion engine.

In the control apparatus for the internal combustion engine according to the present invention, when a driver requests the re-acceleration by pressing down the accelerator in the fuel-supply stop state after a lock-up clutch is disengaged, the lock-up clutch is engaged in a slipping manner so that the engine rpm becomes equal to or higher than cranking rpm while the fuel injection is started. The engine is restarted in this manner, and hence the effects of restarting the engine with a reduced shock without generating foreign noise due to gear meshing in the starter are obtained.

DETAILED DESCRIPTION OF THE PREFERRED EMBODIMENTS

Figure 1:
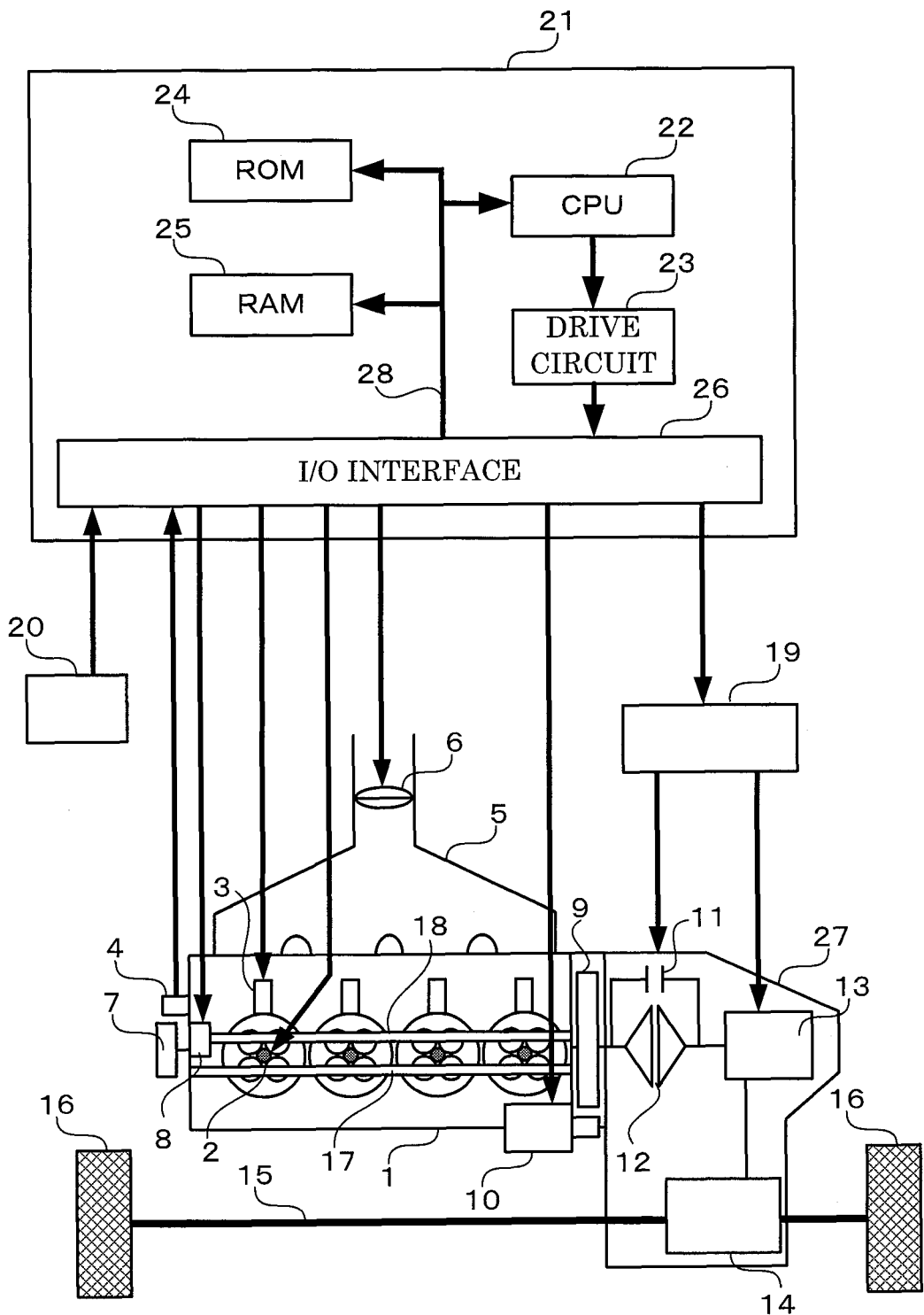
FIG. 1 is a view illustrating a system configuration of a vehicle including a control apparatus for an internal combustion engine and a transmission according to a first embodiment of the present invention.

Hereinafter, a preferred embodiment of a control apparatus for an internal combustion engine according to the present invention is described referring to the drawings.

First Embodiment

FIG. 1 is a view illustrating a system configuration of a vehicle including a control apparatus for an internal combustion engine and a transmission according to a first embodiment of the present invention.

As illustrated in FIG. 1, the system of the vehicle according to the present invention includes an internal combustion engine (hereinafter, also referred to as "engine") main body 1, an intake system 5, a starter 10, a ring gear 9, an automatic transmission 27, an axle 15, driving wheels 16, a crank-angle sensor 4, an accelerator opening-degree detecting device 20, a controller 21, and an automatic transmission hydraulic circuit 19.

An intake camshaft 18 and an exhaust camshaft 17 are provided respectively on an intake valve (not shown) and an exhaust valve (not shown) of the engine main body 1. The intake camshaft 18 and the exhaust camshaft 17 are coupled to a crank pulley 7 through an intermediation of a belt (not shown). The intake camshaft 18 and the exhaust camshaft 17 rotate in synchronization with the rotation of the engine main body 1 to open and close the intake valve and the exhaust valve.

An intake cam timing controller 8 is mounted to the intake camshaft 18. An electric motor provided in the intake cam timing controller 8 is rotated by a drive signal from the controller 21 to create a phase difference between the rotation of the engine and the rotation of the intake camshaft 18, thereby changing opening/closing timing of the intake valve.

Moreover, in the engine main body 1, an ignition device 2 and an injector 3 are mounted to each cylinder. The ignition device 2 is an ignition coil including an igniter therein. A spark plug is mounted at the top of the ignition coil. Ignition timing of each cylinder may be controlled by an ignition signal from the controller 21.

The injector 3 injects a fuel after adjusting a fuel injection amount for a corresponding one of the cylinders according to a width of a drive pulse from the controller 21.

The intake system 5 includes an intake manifold (not shown) and a surge tank (not shown). An electronically-controlled throttle 6 is provided in the middle of the intake system 5. The electronically-controlled throttle 6 changes a throttle opening-degree by the drive signal of the controller 21 to control an engine output.

The starter 10 assists in starting the operation of the engine main body 1 according to the drive signal of the controller 21.

The ring gear 9 couples the starter 10 and the engine main body 1 to each other at the start of the operation of the engine main body 1.

The automatic transmission 27 includes a fluid torque converter 12 including a pump and a turbine which are opposed to each other in a part for receiving power from the engine main body 1, a transmission 13 including a plurality of gear trains, a hydraulic clutch, and the like, which is provided in a subsequent stage, a final-stage reducer 14, and a lock-up clutch 11 for mechanically transmitting the power of the engine main body 1 so as to reduce a power loss due to the fluid in the torque converter 12 in a high-speed steady running condition or the like.

The controller 21 controls the engine main body 1 and the automatic transmission 27. The controller 21 includes a CPU 22, a ROM 24 connected to the CPU 22 through a bus 28, a RAM 25, a drive circuit 23 for driving actuators, and an I/O interface 26.

A program for controlling the engine main body 1 and the automatic transmission 27 is prestored in the ROM 24. According to an instruction of the program, the amount of operation of each of various actuators is computed based on input values of various sensors to drive the various actuators through an intermediation of the drive circuit 23. In this manner, a desired operation may be obtained.

The controller 21 also computes an appropriate amount of operation based on the pressing amount of the accelerator, which is detected by the accelerator opening-degree detecting device 20, the engine rpm, and the like, thereby controlling the throttle opening-degree and the intake valve opening/closing timing.

The controller 21 computes an appropriate amount of operation based on the engine rpm, which is detected by the crank-angle sensor 4, and an intake air amount detected by an airflow sensor (not shown) provided upstream of the electronically-controlled throttle 6 to obtain a fuel injection amount and ignition timing, thereby controlling the ignition devices 2 and the injectors 3.

The controller 21 also controls a transmission gear ratio or a direct coupling ratio of the lock-up clutch 11 through an intermediation of the automatic transmission hydraulic circuit 19.

The automatic transmission hydraulic circuit 19 includes a hydraulic pump (not shown) for generating an oil pressure, and a solenoid valve (not shown) for controlling the oil pressure.

Control signals from the controller 21 are connected respectively to the ignition devices 2 and the injectors 3 of the cylinders. In this manner, control may be individually performed for each cylinder. In FIG. 1, the connection is shown only for a representative one of the cylinders.

The axle 15 is connected to the final-stage reducer 14 of the automatic transmission 27. The driving wheels 16 of the vehicle are connected to the axle 15.

Figure 2:
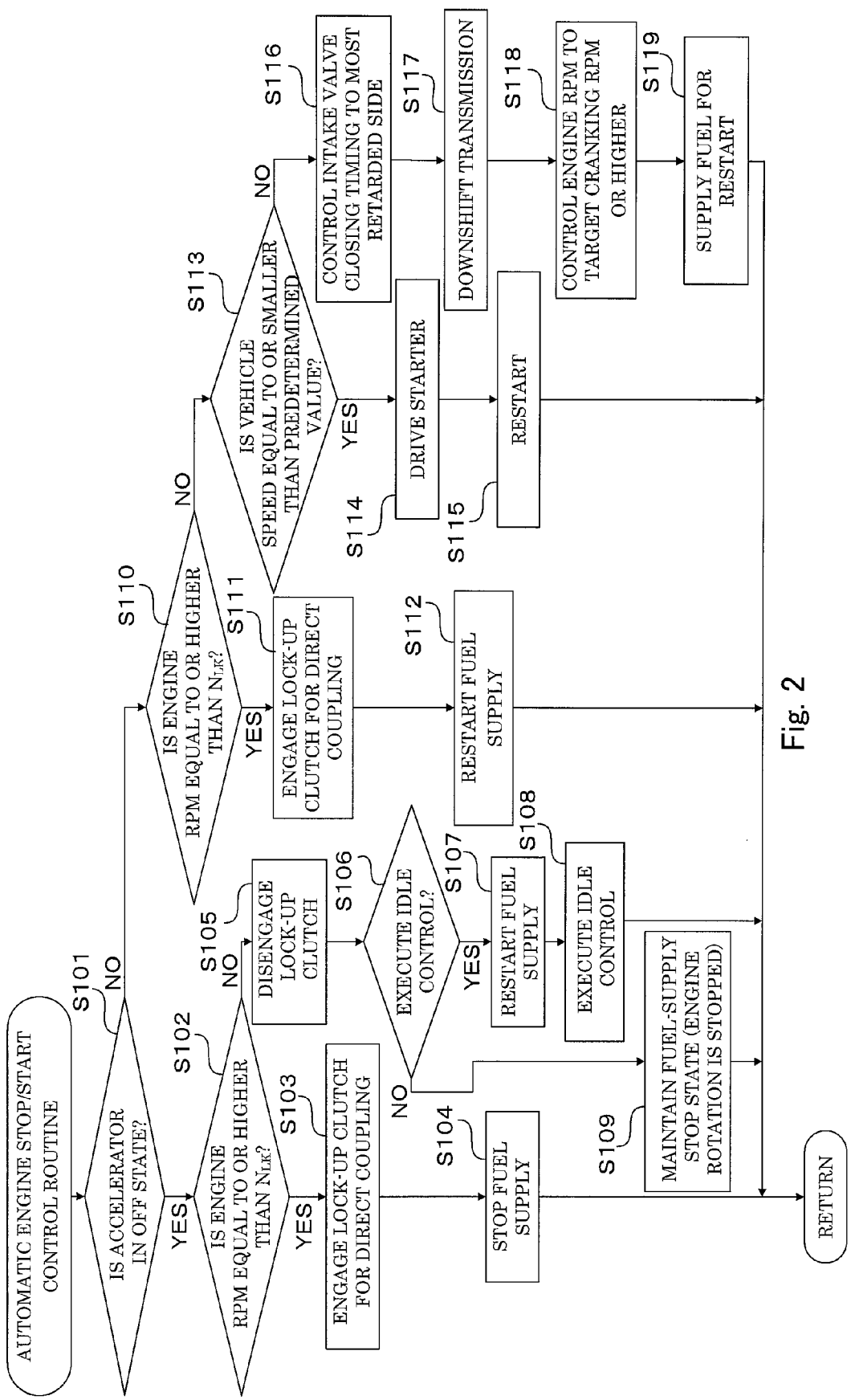
FIG. 2 is a flowchart of an automatic engine stop/start control routine executed by the control apparatus for the internal combustion engine according to the present invention.

Next, an operation of the control apparatus for the internal combustion engine according to the present invention is described referring to a flowchart of FIG. 2.

FIG. 2 is a flowchart of an automatic engine stop/start control routine executed by the control apparatus for the internal combustion engine according to the present invention.

This automatic engine stop/start control routine is incorporated into a part of an engine control main routine for controlling the fuel injection amount, the ignition timing, and an air amount of the engine main body 1, and is executed at every predetermined time interval.

In Step S101, whether the accelerator is not being pressed down (the accelerator is in an OFF state) is judged. When the driver releases the foot from the accelerator and the opening degree of the accelerator is therefore zero, it is judged that the driver has an intention to perform engine-off coasting. Thus, the processing proceeds to Step S102. When the accelerator is being pressed down, the processing proceeds to Step S110.

In Step S102, whether to engage the lock-up clutch for direct coupling or to disengage the lock-up clutch is judged based on the engine rpm. Specifically, when the engine rpm is equal to or higher than lock-up rpm $N_{LK}$, the processing proceeds to Step S103. When the engine rpm is less than the lock-up rpm $N_{LK}$, the processing proceeds to Step S105. The lock-up rpm $N_{LK}$ is engine rpm which enables recovery from a fuel-supply stop state and a transition to an idling operation, and is set slightly higher than idling rpm.

In Step S103, the lock-up clutch 11 is controlled to directly couple the engine main body 1 to the automatic transmission 27.

In Step S104, the fuel supply is stopped in a state where the engine main body 1 is rotated by the vehicle. Then, the processing exits the automatic engine stop/start control routine.

In Step S105, the lock-up clutch 11 is controlled to decouple the engine main body 1 from the automatic transmission 27.

In Step S106, whether or not to execute idle control is judged. For example, when auxiliary machines such as an air conditioner and an alternator are requested to be driven, the processing proceeds to Step S107 so as to maintain an idle state even after the vehicle is stopped. When the execution of the idle control is not requested, the processing proceeds to Step S109.

In Step S107, the fuel supply is restarted.

In Step S108, general idle control is executed. Then, the processing exits the automatic engine stop/start control routine. In the idle control, the throttle opening-degree is subjected to F/B control so as to obtain preset target engine rpm.

In Step S109, while the fuel-supply stop state is maintained, the processing exits the automatic engine stop/start control routine. The fuel-supply stop state is maintained, and hence the vehicle is stopped after the stop of the rotation of the engine.

In Step S110, whether to engage the lock-up clutch for direct coupling or to disengage the lock-up clutch is judged based on the engine rpm. Specifically, when the engine rpm is equal to or higher than the lock-up rpm $N_{LK}$, the processing proceeds to Step S111. When the engine rpm is less than the lock-up rpm $N_{LK}$, the processing proceeds to Step S113.

In Step S111, the lock-up clutch 11 is controlled to directly couple the engine main body 1 to the automatic transmission 27.

In Step S112, the fuel supply is restarted to achieve the so-called recovery from the fuel-supply stop state. Then, the processing exits the automatic engine stop/start control routine.

However, when the engine rpm is less than the lock-up rpm $N_{LK}$, the engine is already stopped in some cases. Moreover, if the fuel supply is restarted at the low engine rpm, there is a fear of occurrence of an engine stall. Therefore, the engine is required to be forcibly rotated from the exterior to be restarted.

Therefore, in Step S113, whether or not a vehicle speed is equal to or less than a predetermined value is judged so as to confirm whether or not a kinetic energy large enough to allow the vehicle to rotate the engine is left. When the vehicle speed is equal to or less than the predetermined value, the processing proceeds to Step S114. When the vehicle speed exceeds the predetermined value, the processing proceeds to Step S116.

In Step S114, it is judged that the kinetic energy large enough to allow the vehicle to rotate the engine is not left. Therefore, the starter is driven.

In Step S115, the fuel is injected to restart the engine. Then, the processing exits the automatic engine stop/start control routine. At this time, the rotation of the engine is almost stopped.

In Step S116, the vehicle speed exceeds the predetermined value, and hence it is judged that the kinetic energy large enough to rotate the engine is left. Therefore, intake-valve closing timing is controlled to the most retarded side. In this manner, the torque required for cranking may be reduced. Therefore, a torque shock occurring when the clutch is engaged in a slipping manner for direct coupling may be reduced. Moreover, the torque required for cranking is reduced, and hence the range of vehicle speed which allows the cranking with the clutch may be expanded.

In Step S117, the automatic transmission is downshifted. A friction clutch such as the lock-up mechanism may only transmit the torque from a high-rpm side to a low-rpm side. Therefore, it is necessary to set the rpm of the transmission side higher than target cranking rpm Ncr. The transmission gear ratio is set larger as the vehicle speed decreases so that turbine rpm of the torque converter becomes higher than the target cranking rpm Ncr. In this manner, it is ensured that the torque is transmitted from the turbine side (vehicle side) to the engine side to rotate the engine.

In Step S118, the lock-up clutch 11 is engaged in a slipping manner and the direct coupling ratio of the lock-up clutch 11 is controlled so that the engine rpm becomes equal to or higher than the target cranking rpm Ncr. Only a positive torque may be transmitted from the lock-up clutch 11, and hence the lock-up clutch 11 is engaged to transmit the torque only when the engine rpm becomes less than the target cranking rpm Ncr. In this manner, the engine main body 1 is forcibly driven. The lock-up clutch 11 is used in a slipping manner, and hence a deceleration shock occurring at the time of engine cranking may be reduced.

In Step S119, the fuel injection is started simultaneously with the start of the engine rotation, thereby restarting the engine. Although the engine is restarted upon re-pressing of the accelerator, which is regarded as the re-acceleration request made by the driver, the engine may also be restarted upon detection of a reduction in the amount of pressing of the brake.

Figure 3:
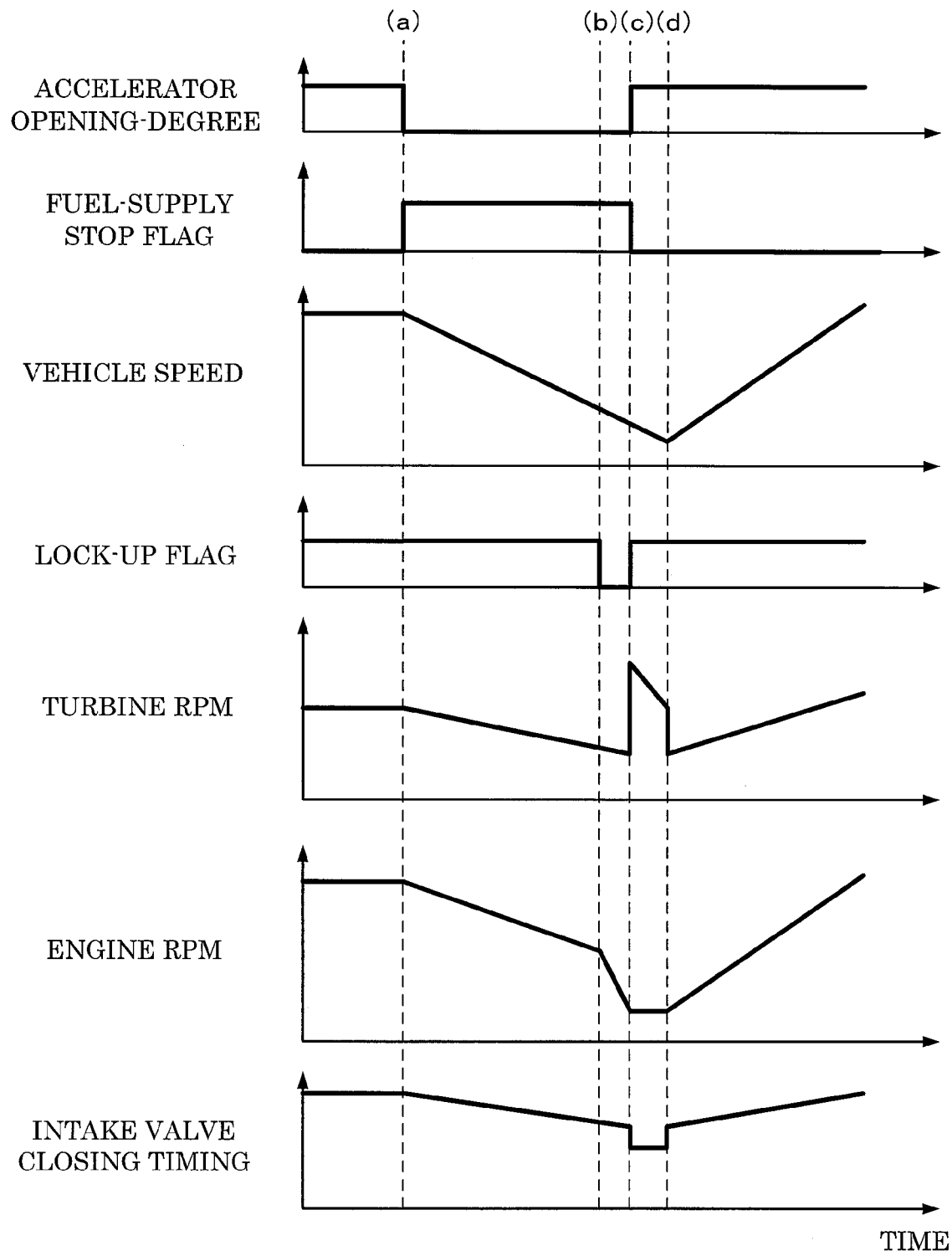
FIG. 3 is a time chart showing a control behavior when an accelerator is pressed down again after the accelerator is temporarily released.

Referring to FIG. 3, a control behavior when the accelerator is pressed down after the lock-up clutch is disengaged is described. FIG. 3 is a time chart showing the control behavior when the accelerator is pressed down again after the accelerator is temporarily released.

First, at a time (a), the driver releases the accelerator. Then, the accelerator opening-degree becomes zero, and hence the fuel supply is stopped. The engine main body 1 and the automatic transmission 27 are directly coupled by the lock-up clutch 11, and hence the turbine rpm and the engine rpm decrease with the deceleration.

At a time (b), the lock-up clutch 11 is disengaged when the engine rpm becomes lower than the lock-up rpm. Therefore, the engine rpm decreases while the engine main body 1, for which the fuel supply is still stopped, is automatically rotating.

When the driver presses down the accelerator for re-acceleration at a time (c), the intake valve closing timing is first controlled to the most retarded side for preparing for the engine restart. Then, the automatic transmission 27 is downshifted to increase the turbine rpm. Subsequently, the lock-up clutch 11 is engaged in a slipping manner for direct coupling to increase the engine rpm to the target cranking rpm. Simultaneously, the fuel injection is started to restart the engine. After the restart is completed, the throttle opening-degree is controlled with the pressing of the accelerator by the driver. Therefore, the vehicle smoothly accelerates.

As described above, when the driver makes the re-acceleration request by pressing down the accelerator after the lock-up clutch is disengaged in the fuel-supply stop state, the lock-up clutch 11 is engaged in a slipping manner so that the engine rpm becomes equal to or higher than the cranking rpm while the fuel injection is restarted, thereby restarting the engine. Therefore, the engine may be restarted with the reduced shock and without the foreign noise due to gear meshing in the starter.

Moreover, the automatic transmission 27 is downshifted to increase the transmission rpm, and hence the transmission rpm may be kept higher than the engine rpm even when the vehicle speed is low. Therefore, it is ensured that the engine rpm may be increased to the cranking rpm.

Further, the intake valve closing timing is controlled to the most retarded side, and hence the cranking torque is reduced to reduce the torque shock when the lock-up clutch is engaged in a slipping manner for direct coupling. Moreover, the torque required for cranking is reduced, and hence the range of the vehicle speed which enables the cranking by using the lock-up clutch 11 may be expanded.

Moreover, the engine torque after the restart is small, and hence there is no shock which suddenly pushes the vehicle forward. Therefore, the re-acceleration may be smoothly performed.

What is claimed is:

1. A control apparatus for an internal combustion engine, for controlling a clutch provided between the internal combustion engine of a vehicle and an automatic transmission, comprising:
   an accelerator opening-degree detection unit for detecting a pressing amount of an accelerator;
   a fuel-supply stopping unit for stopping fuel injection to the internal combustion engine when the accelerator is not pressed down; and
   a clutch direct-coupling ratio control unit capable of controllably changing a power amount transmitted by the clutch from engagement for direct coupling to disengagement of the clutch,
   wherein, when the accelerator is pressed down after the clutch is disengaged in a fuel-supply stop state,
   when vehicle speed is equal to or higher than a predetermined value which allows the vehicle to rotate the engine, the clutch becomes engaged in a slipping manner to engage an axle of the vehicle with the engine, and after the internal combustion engine rpm becomes equal to or higher than a target cranking rpm, the fuel supply is restarted and the internal combustion engine is restarted,
   when the vehicle speed is less than the predetermined value, the internal combustion engine is restarted by a starter which assists in starting the operation of the engine.

2. The control apparatus for the internal combustion engine according to claim 1, further comprising a transmission gear ratio control unit for changing a transmission gear ratio of the automatic transmission,
   wherein, when the accelerator is pressed down while the clutch is disengaged in the fuel-supply stop state, the automatic transmission is downshifted to increase rpm on a transmission side.

3. The control apparatus for the internal combustion engine according to claim 1, further comprising an intake valve timing control unit for controlling opening/closing timing of an intake valve,
   wherein, when the accelerator is pressed down while the clutch is disengaged in the fuel-supply stop state, the closing timing of the intake value is retarded.

4. The control apparatus for the internal combustion engine according to claim 2, further comprising an intake valve timing control unit for controlling opening/closing timing of an intake valve,
   wherein, when the accelerator is pressed down while the clutch is disengaged in the fuel-supply stop state, the closing timing of the intake value is retarded.

* * * * *